United States Patent
Can et al.

(10) Patent No.: US 12,415,761 B2
(45) Date of Patent: *Sep. 16, 2025

(54) SUPERHARD CONSTRUCTIONS AND METHODS OF MAKING SAME

(71) Applicant: ELEMENT SIX (UK) LIMITED, Oxfordshire (GB)

(72) Inventors: Nedret Can, Oxfordshire (GB); Rachael Fiona Ambury, Oxfordshire (GB); Tomasz Zbyszko Rybak, Oxfordshire (GB); Changzheng Ji, Oxfordshire (GB)

(73) Assignee: Element Six (UK) Limited, Oxfordshire (GB)

( * ) Notice: Subject to any disclaimer, the term of this patent is extended or adjusted under 35 U.S.C. 154(b) by 1155 days.

This patent is subject to a terminal disclaimer.

(21) Appl. No.: 16/474,290

(22) PCT Filed: Dec. 28, 2017

(86) PCT No.: PCT/EP2017/084716
§ 371 (c)(1),
(2) Date: Jun. 27, 2019

(87) PCT Pub. No.: WO2018/122310
PCT Pub. Date: Jul. 5, 2018

(65) Prior Publication Data
US 2019/0337855 A1     Nov. 7, 2019

(30) Foreign Application Priority Data
Dec. 31, 2016   (GB) ..................... 1622453

(51) Int. Cl.
*C04B 35/528*   (2006.01)
*B22F 3/14*     (2006.01)
(Continued)

(52) U.S. Cl.
CPC .............. *C04B 35/528* (2013.01); *B22F 3/14* (2013.01); *B22F 7/06* (2013.01); *C04B 35/5831* (2013.01);
(Continued)

(58) Field of Classification Search
CPC .......... C04B 35/528; C04B 2235/3856; C04B 2235/386; C04B 2235/427;
(Continued)

(56) References Cited

U.S. PATENT DOCUMENTS

| | | | |
|---|---|---|---|
| 6,068,913 A | 5/2000 | Cho et al. | |
| 7,757,791 B2 * | 7/2010 | Belnap | B22F 7/06 428/408 |

(Continued)

FOREIGN PATENT DOCUMENTS

| | | |
|---|---|---|
| EP | 0601840 A1 | 6/1994 |
| GB | 2373528 A | 9/2002 |

(Continued)

OTHER PUBLICATIONS

Combined Search and Examination Report issued for Application No. GB1622453.7, mailed May 18, 2017 (9 pages).

(Continued)

*Primary Examiner* — Jie Yang
(74) *Attorney, Agent, or Firm* — Armstrong Teasdale LLP (57) ABSTRACT

A super hard polycrystalline construction has a first region comprising a body of thermally stable polycrystalline super hard material having an exposed surface forming a working surface, and a peripheral side edge, said polycrystalline super hard material comprising a plurality of intergrown grains of super hard material; a second region forming a substrate to the first region; and a third region interposed between the first and second regions. The third region extends across a surface of the second region along an (Continued)

interface, the interface comprising at least a portion having an uneven topology, the third region comprising a composite material having a first phase comprising a plurality of non-intergrown grains of super hard material, and a matrix material, the third region having a wear resistance at least three times less than sintered polycrystalline diamond material having the same average grain size of diamond grains as the super hard grains in the third region.

19 Claims, 4 Drawing Sheets

(51) Int. Cl.

| | | |
|---|---|---|
| *B22F 7/06* | (2006.01) | |
| *C04B 35/5831* | (2006.01) | |
| *C04B 35/626* | (2006.01) | |
| *C04B 35/63* | (2006.01) | |
| *C04B 35/645* | (2006.01) | |
| *B22F 3/24* | (2006.01) | |
| *B22F 5/00* | (2006.01) | |
| *E21B 10/573* | (2006.01) | |

(52) U.S. Cl.
CPC ...... *C04B 35/6261* (2013.01); *C04B 35/6303* (2013.01); *C04B 35/645* (2013.01); *B22F 2003/244* (2013.01); *B22F 2005/001* (2013.01); *C04B 2235/3856* (2013.01); *C04B 2235/386* (2013.01); *C04B 2235/3886* (2013.01); *C04B 2235/402* (2013.01); *C04B 2235/405* (2013.01); *C04B 2235/427* (2013.01); *C04B 2235/5236* (2013.01); *C04B 2235/5472* (2013.01); *C04B 2235/6567* (2013.01); *C04B 2237/086* (2013.01); *C04B 2237/363* (2013.01); *E21B 10/5735* (2013.01)

(58) Field of Classification Search
CPC ...... C04B 2235/5436; C04B 2237/401; C04B 35/5831; C04B 35/645; C04B 37/025; B22F 2005/001; B22F 7/06; C22C 2026/003; C22C 26/00; C22C 29/06; C22C 29/08; C23F 1/02; E21B 10/5735
USPC .......................................................... 423/446
See application file for complete search history.

(56) References Cited

U.S. PATENT DOCUMENTS

| | | | |
|---|---|---|---|
| 9,249,662 B2* | 2/2016 | Jonker | B25D 17/02 |
| 2008/0179109 A1* | 7/2008 | Belnap | B22F 7/06 |
| | | | 175/432 |
| 2011/0083907 A1* | 4/2011 | Israelsson | B24D 3/10 |
| | | | 175/428 |
| 2011/0171414 A1* | 7/2011 | Sreshta | E21B 10/5673 |
| | | | 428/323 |
| 2013/0000993 A1 | 1/2013 | Shabalala et al. | |
| 2014/0239051 A1 | 8/2014 | Barry et al. | |
| 2018/0036696 A1* | 2/2018 | Can | C04B 37/026 |
| 2019/0337857 A1* | 11/2019 | Can | C22C 26/00 |
| 2019/0344351 A1* | 11/2019 | Ambury | C22C 29/06 |
| 2019/0351487 A1* | 11/2019 | Ambury | C04B 35/528 |

FOREIGN PATENT DOCUMENTS

| | | |
|---|---|---|
| WO | 2008063568 A1 | 5/2008 |
| WO | 2008079205 A1 | 7/2008 |
| WO | 2011098559 A1 | 8/2011 |
| WO | 2015069967 A1 | 5/2015 |
| WO | 2015101638 A1 | 7/2015 |
| WO | 2016135332 A1 | 9/2016 |

OTHER PUBLICATIONS

Combined Search and Examination Report issued for Application No. GB1722065.8, mailed May 30, 2018 (10 pages).
International Search Report and Written Opinion issued for Application No. PCT/EP2017/084716, mailed Mar. 29, 2018 (27 pages).

* cited by examiner

SUPERHARD CONSTRUCTIONS AND METHODS OF MAKING SAME

CROSS-REFERENCE TO RELATED APPLICATIONS

This application is the § 371 national stage of International Application No. PCT/EP2017/084716, filed Dec. 28, 2017, which claims priority to Great Britain Application No. 1622453.7, filed Dec. 31, 2016.

FIELD

This disclosure relates to superhard constructions and methods of making such constructions, particularly but not exclusively to constructions comprising polycrystalline diamond (PCD) structures attached to a substrate, and tools comprising the same, particularly but not exclusively for use in rock degradation or drilling, or for boring into the earth.

BACKGROUND

Polycrystalline super hard materials, such as polycrystalline diamond (PCD) and polycrystalline cubic boron nitride (PCBN) may be used in a wide variety of tools for cutting, machining, drilling or degrading hard or abrasive materials such as rock, metal, ceramics, composites and wood-containing materials. In particular, tool inserts in the form of cutting elements comprising PCD material are widely used in drill bits for boring into the earth to extract oil or gas. The working life of super hard tool inserts may be limited by failure of the super hard material, including by spalling and chipping, or by wear of the tool insert.

Cutting elements such as those for use in rock drill bits or other cutting tools typically have a body in the form of a substrate which has an interface end/surface and a super hard material which forms a cutting layer bonded to the interface surface of the substrate by, for example, a sintering process. The substrate is generally formed of a tungsten carbide-cobalt alloy, sometimes referred to as cemented tungsten carbide and the super hard material layer is typically polycrystalline diamond (PCD), polycrystalline cubic boron nitride (PCBN) or a thermally stable product TSP material such as thermally stable polycrystalline diamond.

Polycrystalline diamond (PCD) is an example of a super hard material (also called a superabrasive material or ultra hard material) comprising a mass of substantially intergrown diamond grains, forming a skeletal mass defining interstices between the diamond grains. PCD material typically comprises at least about 80 volume % of diamond and is conventionally made by subjecting an aggregated mass of diamond grains or carbon source to an ultra-high pressure of greater than about 5 GPa, and temperature of at least about 1,200° C., for example. A material wholly or partly filling the interstices may be referred to as filler or binder material.

PCD is typically formed in the presence of a sintering aid such as cobalt, which promotes the inter-growth of diamond grains. Suitable sintering aids for PCD are also commonly referred to as a solvent-catalyst material for diamond, owing to their function of dissolving, to some extent, the diamond and catalysing its re-precipitation. A solvent-catalyst for diamond is understood be a material that is capable of promoting the growth of diamond or the direct diamond-to-diamond inter-growth between diamond grains at a pressure and temperature condition at which diamond is thermodynamically stable. Consequently the interstices within the sintered PCD product may be wholly or partially filled with residual solvent-catalyst material. Most typically, PCD is often formed on a cobalt-cemented tungsten carbide substrate, which provides a source of cobalt solvent-catalyst for the PCD.

Ever increasing drives for improved productivity in the earth boring field place ever increasing demands on the materials used for cutting rock. Specifically, PCD materials with improved abrasion and impact resistance are required to achieve faster cut rates and longer tool life.

One of the factors limiting the success of the polycrystalline diamond (PCD) abrasive cutters particularly when used as cutting elements in drill bits for boring into the earth in the oil and gas drilling industry is the generation of heat due to friction between the PCD and the work material. This heat causes the thermal degradation of the diamond layer. The thermal degradation increases the wear rate of the cutter through increased cracking and spalling of the PCD layer as well as back conversion of the diamond to graphite causing increased abrasive wear. In particular, the high temperatures incurred during operation cause the residual binder-catalyst, e.g. cobalt, in the diamond matrix to thermally expand. This thermal expansion is known to cause the diamond crystalline bonds within the microstructure to be broken at or near the cutting edge, thereby also operating to reduce the life of the PCD cutter. Also, in high temperature cutting environments, the cobalt in the PCD matrix can facilitate the conversion of diamond back to graphite, which is also known to radically decrease the performance life of the cutting element.

Attempts in the art to address the above-noted limitations have largely focused on the solvent catalyst material's degradation of the PCD construction by catalytic operation, and removal of the catalyst material therefrom for the purpose of enhancing the working life of PCD cutting elements. For example, it is known to treat the PCD body to remove the solvent catalyst material therefrom. One known way of doing this involves removing the solvent catalyst material for example by an acid leaching process. To obtain the maximum benefit, ideally all of the accessible residual solvent catalyst should be removed from the PCD material however, there are many examples in the prior art that acknowledge the extreme difficulty and problems associated in practice with fully leaching the PCD material of such residual solvent catalyst. Firstly, it is known that removing substantially all of the residual catalyst-binder from the interstitial spaces weakens the PCD material by as much as 30% so whilst the abrasion resistance of such a PCD composite may be improved there is a significant decrease in impact resistance of the composite which reduces the working life of the composite. Secondly, the substrate portion of the composite which is typically formed of tungsten carbide is particularly vulnerable to attack and degradation by the acid used in techniques such as acid leaching. This is particularly problematic if the interface between the PCD region and the substrate is non planar as protruding interface features in the carbide material would be subject to attack from the acid during the leaching process thereby weakening the bond between the PCD material and substrate which could reduce the working life of the element.

To address these problems, various leaching profiles have been developed to remove solvent catalyst material only from specific regions in the PCD material leaving an amount of residual catalyst in the PCD material, particularly along the interface with the substrate to preserve the bond therebetween. However, as mentioned above, leaving residual catalyst solvent in the cutting element does not eliminate the problems associated with thermal degradation due to the mismatch in coefficients of thermal expansion between the diamond grains and solvent catalyst.

Another solution proposed in the art if it is desired to remove all of the residual solvent catalyst from the PCD material, is to attach a new substrate to the TS PCD once leached prior to use as a cutting element. This is typically required due to the vulnerability of the tungsten carbide substrate to attack and degradation by the acid used in the conventional leaching techniques. However, a difficulty also known to exist with such TS PCD is the challenge associated with attaching the TS body to a new substrate to form a usable compact. Not only are there problems in achieving a join that has sufficient strength to withstand the extreme working conditions such as in drilling applications but also forming such a join has typically only been possible with planar interfaces between such pieces. This itself results in residual stress problems between the joined materials in application thereby impacting the working life of the compact.

Additionally, past attempts made to attach such TS PCD to a substrate by an HPHT process have resulted in crack formation in the TS PCD and/or delamination between the substrate and TS PCD body during use, making it unsuitable for use in a cutting and/or wear environment. Such crack formation is even more problematic when attempting to attach TS PCD to a substrate where the interface between the two is nonplanar and therefore has not typically been deemed viable.

It is, therefore, desirable that a thermally stable polycrystalline diamond construction be engineered in a manner that not only displays improved thermal characteristics, when compared to conventional PCD, but also has improved fracture toughness without adversely affecting the material's high strength and abrasion resistance.

SUMMARY

Viewed from a first aspect there is provided a super hard polycrystalline construction comprising:
 a first region comprising a body of thermally stable polycrystalline super hard material having an exposed surface forming a working surface, and a peripheral side edge, said polycrystalline super hard material comprising a plurality of intergrown grains of super hard material;
 a second region forming a substrate to the first region; and
 a third region interposed between the first and second regions; wherein:
 the third region extends across a surface of the second region along an interface, the interface comprising at least a portion having an uneven topology, the third region comprising a composite material having a first phase comprising a plurality of non-intergrown grains of super hard material, and a matrix material, the third region having a wear resistance at least three times less than sintered polycrystalline diamond material having the same average grain size of diamond grains as the super hard grains in the third region Viewed from a second aspect there is provided a method of forming a super hard polycrystalline construction comprising:
 forming a pre-sinter assembly comprising:
 a first mass of grains or particles of a super hard material;
 a source of catalysing material for the first mass of grains or particles of super hard material;
 a further mass of grains or particles of a super hard material mixed with a non-super hard material; and
 a mass of grains or particles of a material to form a substrate;
 treating the pre-sinter assembly at an ultra-high pressure of around 5 GPa or greater and a temperature to bond together the grains of super hard material in the first mass to form a first region comprising a body of interbonded polycrystalline super hard material bonded to a further region formed of substantially non-interbonded grains or particles of the super hard material in the further mass; the further region being bonded to the substrate along an interface, the interface comprising at least a portion having an uneven topology, the further region forming an intermediate region between the first region and the substrate and comprising:
 a composite material including:
 a first phase comprising a plurality of non-intergrown grains of super hard material, and
 a matrix material; wherein: the intermediate region has a wear resistance at least three times less than sintered polycrystalline diamond material having the same average grain size of diamond grains as the super hard grains in the third region Viewed from a further aspect there is provided a tool comprising the superhard polycrystalline construction defined above, the tool being for cutting, milling, grinding, drilling, earth boring, rock drilling or other abrasive applications.

The tool may comprise, for example, a drill bit for earth boring or rock drilling, a rotary fixed-cutter bit for use in the oil and gas drilling industry, or a rolling cone drill bit, a hole opening tool, an expandable tool, a reamer or other earth boring tools.

Viewed from another aspect there is provided a drill bit or a cutter or a component therefor comprising the superhard polycrystalline construction defined above.

BRIEF DESCRIPTION OF THE DRAWINGS

Various versions will now be described by way of example and with reference to the accompanying drawings in which.

The same references refer to the same general features in all the drawings.

DESCRIPTION

As used herein, a "superhard material" is a material having a Vickers hardness of at least about 28 GPa. Diamond and cubic boron nitride (cBN) material are examples of superhard materials.

As used herein, a "superhard construction" means a construction comprising a body of polycrystalline superhard material. In such a construction, a substrate may be attached thereto.

As used herein, polycrystalline diamond (PCD) is a type of polycrystalline superhard (PCS) material comprising a mass of diamond grains, a substantial portion of which are directly inter-bonded (intergrown) with each other and in which the content of diamond is at least about 80 volume percent of the material. In one example of PCD material, directly after sintering, interstices between the diamond grains may be at least partly filled with a binder material comprising a catalyst for diamond. As used herein, "interstices" or "interstitial regions" are regions between the diamond grains of PCD material.

A "catalyst material" for a superhard material is capable of promoting the growth or sintering of the superhard material.

The term "substrate" as used herein means any substrate over which the superhard material layer is formed. For example, a "substrate" as used herein may be a transition layer formed over another substrate.

As used herein, the term "integrally formed" means regions or parts are produced contiguous with each other and are not separated by a different kind of material.

As used herein, the term "super hard composite" means a composite material formed of substantially non-intergrown grains of super hard material in a matrix of binder phase material, for example less than 3% of the grains of super hard material are intergrown, and in some instances none of the super hard grains are intergrown. Whether or not the super hard grains are intergrown may be determined using conventional methods of SEM or X-ray analysis of images taken of the construction. In addition, for a substantially non-intergrown structure, the wear resistance of the material will be substantially less (that is, worse) than sintered polycrystalline diamond material having the same average grain size of diamond grains as the super hard grains in the composite structure. This may be confirmed using conventional tests such as a vertical borer test of the material.

Figure 1:
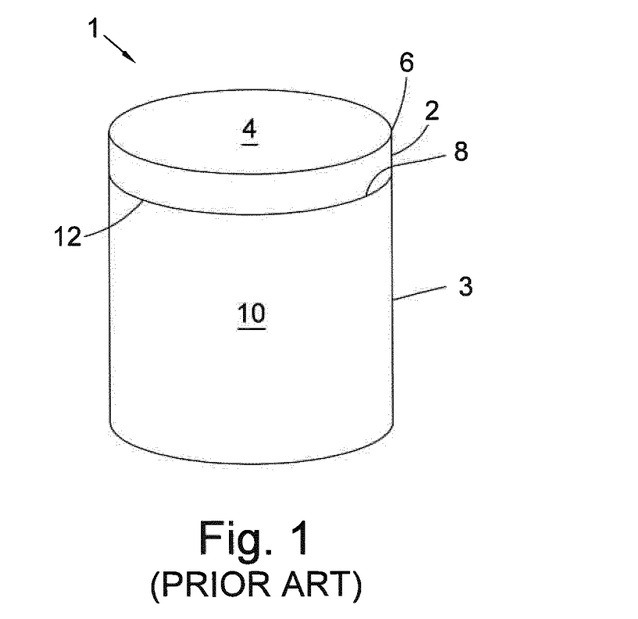
FIG. 1 is a perspective view of an example of a conventional PCD cutter element or construction for a drill bit for boring into the earth.

FIG. 1 is a schematic view of an example of a conventional PCD super hard construction such as a cutting element 1 which includes a substrate 3 with a layer of superhard material 2 formed on the substrate 3. The substrate 3 may be formed of a hard material such as cemented tungsten carbide. The superhard material 2 may be, for example, high density polycrystalline diamond (PCD) comprising at least 80 vol % of interbonded (intergrown) diamond grains. The cutting element 1 may be mounted into a bit body such as a drag bit body (not shown) and may be suitable, for example, for use as a cutter insert for a drill bit for boring into the earth.

The exposed top surface of the superhard material opposite the substrate forms the cutting face 4, also known as the working surface, which is the surface which, along with its edge 6, performs the cutting in use.

At one end of the substrate 3 is an interface surface 8. As shown in FIG. 1, the substrate 3 is generally cylindrical and has a peripheral surface 10 and a peripheral top edge 12.

The working surface or "rake face" 4 of the polycrystalline composite construction 1 is the surface or surfaces over which the chips of material being cut flow when the cutter is used to cut material from a body, the rake face 4 directing the flow of newly formed chips. This face 4 is commonly also referred to as the top face or working surface of the cutting element as the working surface 4 is the surface which, along with its edge 6, is intended to perform the cutting of a body in use. It is understood that the term "cutting edge", as used herein, refers to the actual cutting edge, defined functionally as above, at any particular stage or at more than one stage of the cutter wear progression up to failure of the cutter, including but not limited to the cutter in a substantially unworn or unused state.

As used herein, "chips" are the pieces of a body removed from the work surface of the body being cut by the polycrystalline composite construction 1 in use.

As used herein, a "wear scar" is a surface of a cutter formed in use by the removal of a volume of cutter material due to wear of the cutter. A flank face may comprise a wear scar. As a cutter wears in use, material may progressively be removed from proximate the cutting edge, thereby continually redefining the position and shape of the cutting edge, rake face and flank as the wear scar forms.

The substrate 3 is typically formed of a hard material such as a cemented carbide material, for example, cemented tungsten carbide.

Figure 2:
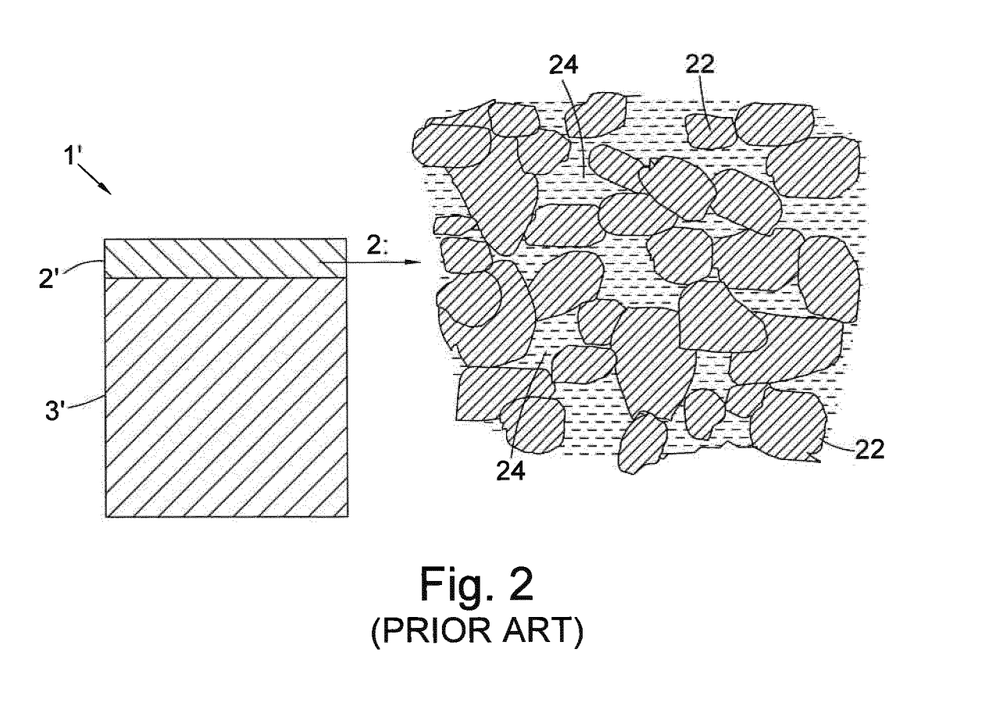
FIG. 2 is a schematic cross-section of a conventional portion of a PCD micro-structure with interstices between the inter-bonded diamond grains filled with a non-diamond phase material.

As shown in FIG. 2, during formation of a conventional polycrystalline composite construction 1, the interstices 24 between the inter-bonded grains 22 of super hard material such as diamond grains in the case of PCD, may be at least partly filled with a non-super hard phase material. This non-super hard phase material, also known as a filler material may comprise residual catalyst/binder material, for example cobalt.

FIGS. 3 to 10 are schematic cross-sections through examples of super hard constructions which may have the same outer shape as the construction 1 of FIG. 1.

Figure 3:
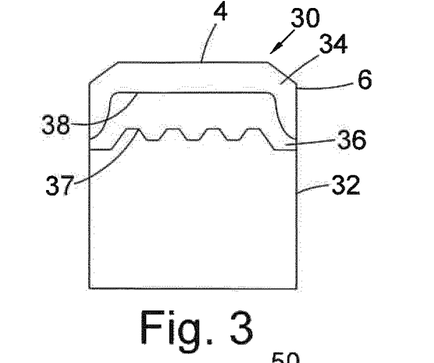
FIG. 3 is a schematic cross-section of a first example of a superhard construction.

In a first example, as shown in FIG. 3, the superhard construction 30 includes a layer or region of super hard material 34 forming the rake face or cutting surface 4 and having the cutting edge 6, a substrate 32 and a region 36 intermediate the layer of superhard material 34 and the substrate 32. The interface 37 between the substrate and the intermediate region 36 has at least a portion having an uneven topology. This may be interpreted as, but not limited to, covering one or more of the surface being non-uniform, varying, irregular, rugged, not level, and/or not smooth, and/or with peaks and troughs. Additionally, in the example shown in FIG. 3, the interface 38 between the layer of super hard material 34 and the intermediate region 36 is substantially non-planar.

In the example of FIG. 3, the intermediate region 36 does not form part of the working surface but is spaced therefrom by a region of the super hard material 34. Additionally, the intermediate region 36 of super hard composite material extends across the interface 37 with the substrate 32 and spaces the super hard layer 34 from the substrate 32.

Figure 4:
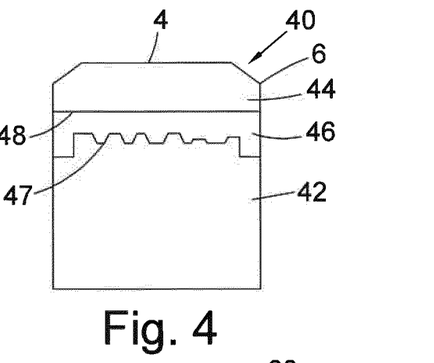
FIG. 4 is a schematic cross-section of a second example of a superhard construction.

The example of a super hard construction 40 shown in FIG. 4 differs from that shown in FIG. 3 in that the interface 48 between the layer of super hard material 44 and the intermediate region 46 is substantially planar.

Figure 5:
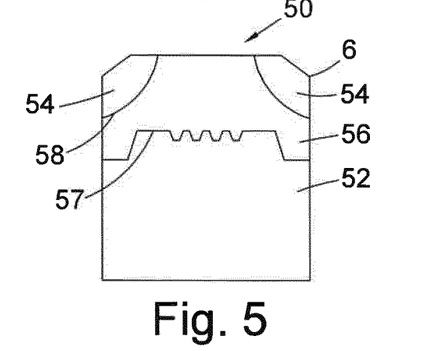
FIG. 5 is a schematic cross-section of a third example of a superhard construction.

The further example of a super hard construction 50 shown in FIG. 5 differs from that shown in FIG. 3 in that an intermediate region 56 of a composite material formed of non-interbonded grains of super hard material, such as diamond grains, that is interposed between a substrate 52 and layer of super hard material 54 extends to and forms part of the working surface 4 of the super hard construction 50. The interface 57 between the intermediate region 56 and the substrate 52 has at least a portion having an uneven topology and the interface 58 between the intermediate region 56 and the layer of super hard material 54 is also substantially non-planar, the interface 58 being concavely arcuate.

Figure 6:
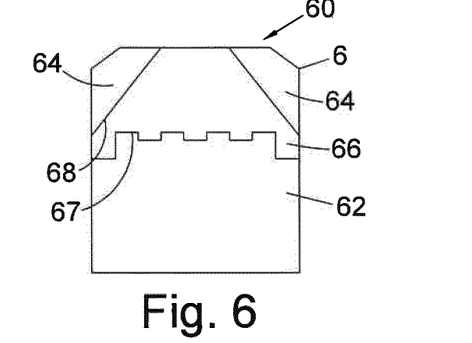
FIG. 6 is a schematic cross-section of a fourth example of a superhard construction.

FIG. 6 is an example similar to that shown in FIG. 5 with the exception that the interface 68 between the region or layer of polycrystalline super hard material 64 and the intermediate region 68 is sloped outwardly from the working surface towards the substrate 62 rather than concavely curved, and that is shown by the inclined plane depicted in in cross section in FIG. 6, the intermediate region 66 thereby comprising a truncated cone projecting from the substrate 62 and extending through the layer or region of super hard material 64 to the cutting face, forming part of the working surface of the super hard construction 60.

Figure 7:
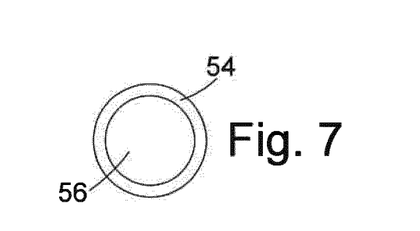
FIG. 7 is a schematic plan view of the superhard construction of FIG. 5.

FIG. 7 shows the example construction of FIG. 5 in plan view and it will be seen that the super hard region or layer 54 forms an annular portion around the outer peripheral surface of the intermediate region of composite material 56.

Figure 8:
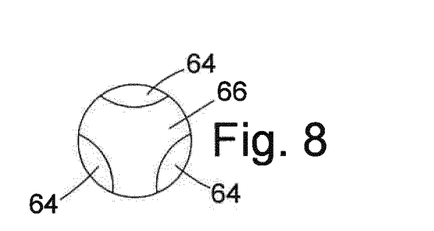
FIG. 8 is a schematic plan view of the superhard construction of FIG. 6.

As shown in the plan views, FIGS. 7 and 8, of the examples of FIGS. 5 and 6 respectively, the super hard layer or region 54 may form an annular portion around the outer peripheral surface of the intermediate region 56 of composite material, or the layer or region of super hard material 64 may be in the form of segments interposed around the cutting edge with the intermediate region 64. The advantage of such a construction may be that the construction may be rotatable after use such that a different cutting edge may be presented to the surface to be cut and also the segments may act to confine damage to a limited area of the construction during use.

Figure 9:
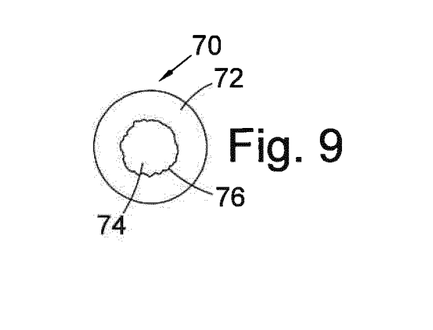
FIG. 9 is a is a schematic alternative plan view of the superhard construction of FIG. 5.

In some examples, such as that shown in FIG. 9, and in particular those where the intermediate region 74 extends to and forms part of the cutting face 4, the interface 76 between the intermediate region 74 and the layer of super hard material 72 may be ridged or grooved, such ridges or grooves extending, for example, from the cutting face 4 to the flank face of the construction.

In some examples (not shown), the intermediate region may have the general structure of that shown in FIGS. 5 and 6 but may not extend all the way to or form part of the working surface. For example, the intermediate region may extend to a distance of around 0.5 mm or less from the working surface.

Figure 10:
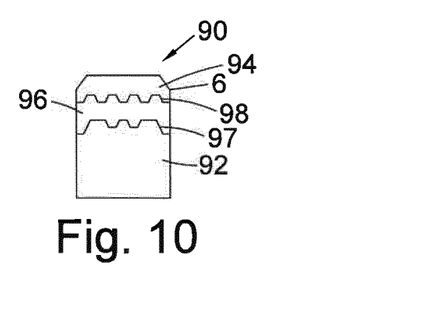
FIG. 10 is a schematic cross-section of a sixth example of a super hard construction.

In the further example shown in FIG. 10, the super hard construction 90 comprises a substrate 92, a layer of super hard material 94 and an intermediate region 96 between the layer of super hard material 94 and the substrate 92 spacing the layer of super hard material 94 from the substrate 92. The interface 97 between the substrate and the intermediate region 96 has at least a portion having an uneven topology and the interface 98 between the intermediate region 96 and the layer of super hard material 94 is also substantially non-planar, and may comprise one or more grooves or ridges to provide an interlocking fit between the two layers.

In one or more of the examples, such as those shown in any one or more of FIGS. 3 to 10, the layer or region of super hard material 34, 44, 54, 64, 74, 94, prior to final processing and directly after sintering, may for example have a microstructure with interstices between the inter-bonded grains of super hard material filled with a non-super hard phase material such as that shown in the representation of conventional PCD in FIG. 2. However, in the end product, in the case of the super hard grains being diamond, the interstitial spaces between inter-bonded diamond grains are substantially free of accessible residual solvent catalyst that would otherwise be present in the interstitial spaces and the layer or region of super hard material 34, 44, 54, 64, 74, 94, is considered to be fully leached thermally stable PCD.

The super hard material of the various examples used to form the layer or region of super hard material 34, 44, 54, 64, 74, 94, may be, for example, polycrystalline diamond (PCD) and/or polycrystalline cubic boron nitride (PCBN) and/or lonsdalite and the super hard particles or grains may be of natural and/or synthetic origin.

The substrate of the examples, 32, 42, 52, 62, 72, 92 may be formed of a hard material such as a cemented carbide material and may include, for example, cemented tungsten carbide, cemented tantalum carbide, cemented titanium carbide, cemented molybdenum carbide or mixtures thereof. The binder metal for such carbides suitable for forming the substrate 32, 42, 52, 62, 72, 92 may be, for example, nickel, cobalt, iron or an alloy containing one or more of these metals and may include additional elements or compounds of other materials such as chromium, or vanadium. This binder may, for example, be present in an amount of 10 to 20 mass %, but this may be as low as 6 mass % or less.

In some examples, the layer or region of polycrystalline super hard material 34, 44, 54, 64, 74, 94, may be a high density PCD formed of more than 95 vol % of diamond. Such a PCD body may be formed using known methods such as by sintering the diamond grains at sintering pressures of around 8 GPa and above, as described in US patent application published as US 2010/0084196.

In some examples, the layer or region of polycrystalline super hard material 34, 44, 54, 64, 74, 94, may be formed of high density PCD comprising a sintered mass of nano diamond grains as set out in US patent application published as US2005/019114.

In some examples, high density or binderless PcBN, and PcBN constructions formed from nanomaterials may also be formed according to known methods.

In some examples, the layer or region of super hard material 34, 44, 54, 64, 74, 94, may comprise PCBN. Components comprising PCBN are used principally for machining metals. PCBN material comprises a sintered mass of cubic boron nitride (cBN) grains. The cBN content of PCBN materials may be at least about 40 volume %. When the cBN content in the PCBN is at least about 70 volume % there may be substantial direct contact among the cBN grains. When the cBN content is in the range from about 40 volume % to about 60 volume % of the compact, then the extent of direct contact among the cBN grains is limited. PCBN may be made by subjecting a mass of cBN particles together with a powdered matrix phase, to a temperature and pressure at which the cBN is thermodynamically more stable than the hexagonal form of boron nitride, hBN. PCBN is less wear resistant than PCD which may make it suitable for different applications to that of PCD.

As used herein, a PCD or PCBN grade is a PCD or PCBN material characterised in terms of the volume content and size of diamond grains in the case of PCD or cBN grains in the case of PCBN, the volume content of interstitial regions between the grains, and composition of material that may be present within the interstitial regions. A grade of super hard material may be made by a process including providing an aggregate mass of super hard grains having a size distribution suitable for the grade, optionally introducing catalyst material or additive material into the aggregate mass, and subjecting the aggregated mass in the presence of a source of catalyst material for the super hard material to a pressure and temperature at which the super hard grains are more thermodynamically stable than graphite (in the case of diamond) or hBN (in the case of CBN), and at which the catalyst material is molten. Under these conditions, molten catalyst material may infiltrate from the source into the aggregated mass and is likely to promote direct intergrowth between the diamond grains in a process of sintering, to form a polycrystalline super hard structure. The aggregate mass may comprise loose super hard grains or super hard grains held together by a binder material. In the context of diamond, the diamond grains may be natural or synthesised diamond grains.

Different grades of super hard material such as polycrystalline diamond may have different microstructures and different mechanical properties, such as elastic (or Young's) modulus E, modulus of elasticity, transverse rupture strength (TRS), toughness (such as so-called KiC toughness), hardness, density and coefficient of thermal expansion (CTE). Different PCD grades may also perform differently in use. For example, the wear rate and fracture resistance of different PCD grades may be different.

The layer or region 34, 44, 54, 64, 74, 94, of polycrystalline super hard material shown in the cutter elements 30, 40, 50, 60, 70, 90 of FIGS. 3 to 10 may comprise, for example, one or more grades of super hard material and may comprise one or more layers of super hard material which may differ in, for example, grain size and/or composition of the super hard material.

In particular, the grains of super hard material may be, for example, diamond grains or particles. In the starting mixture prior to sintering they may be, for example, bimodal, that is, the feed comprises a mixture of a coarse fraction of diamond grains and a fine fraction of diamond grains. In some embodiments, the coarse fraction may have, for example, an average particle/grain size ranging from about 10 to 60 microns. By "average particle or grain size" it is meant that the individual particles/grains have a range of sizes with the mean particle/grain size representing the "average". The average particle/grain size of the fine fraction is less than the size of the coarse fraction. For example, the fine fraction may have an average grain size of between around 1/10 to 6/10 of the size of the coarse fraction, and may, in some embodiments, range for example between about 0.1 to 20 microns.

In some examples, the weight ratio of the coarse diamond fraction to the fine diamond fraction may range from about 50% to about 97% coarse diamond and the weight ratio of the fine diamond fraction may be from about 3% to about 50%. In other embodiments, the weight ratio of the coarse fraction to the fine fraction may range from about 70:30 to about 90:10.

In further examples, the weight ratio of the coarse fraction to the fine fraction may range for example from about 60:40 to about 80:20.

In some examples, the particle size distributions of the coarse and fine fractions do not overlap and in some embodiments the different size components of the compact are separated by an order of magnitude between the separate size fractions making up the multimodal distribution.

Some examples consist of a wide bi-modal size distribution between the coarse and fine fractions of super hard material, but some examples may include three or even four or more size modes which may, for example, be separated in size by an order of magnitude, for example, a blend of particle sizes whose average particle size is 20 microns, 2 microns, 200 nm and 20 nm.

Sizing of diamond particles/grains into fine fraction, coarse fraction, or other sizes in between, may be through known processes such as jet-milling of larger diamond grains and the like.

In some examples, the cemented metal carbide substrate 32, 42, 52, 62, 72, 92 may, for example, be conventional in composition and, thus, may include any of the Group IVB, VB, or VIB metals, which are pressed and sintered in the presence of a binder of cobalt, nickel or iron, or alloys thereof. In some examples, the metal carbide is tungsten carbide.

The intermediate region 36, 46, 56, 66, 76, 96 is a composite material formed of non-interbonded grains of super hard material, such as diamond grains, and a matrix material. In some examples, the matrix material further comprises a second phase such as a material that has a lower hardness than the hardness of the super hard grains. The additional hard material may, for example be any one or more of cBN, WC, wBN and the like. In some examples the matrix material of the intermediate region comprises any one or more alloys or compounds of any one or more transition metals including titanium, zirconium, vanadium, hafnium, tantalum, niobium, chromium, molybdenum, tungsten, copper, cobalt, nickel, iron, manganese, and/or rhenium. The one or more alloys or compounds may, for example be any one or more oxides, nitrides, carbides, carbonitrides, and/or oxycarbides of said transition metals. In some examples, the matrix material comprises aluminium, and/or nickel and/or one or more alloys or compounds thereof.

In further examples, the matrix material of the intermediate region comprises any one or more of titanium carbonitride, titanium diboride, aluminium nitride, aluminium oxide, cobalt, and tungsten carbide, or alloys or compounds thereof.

In some examples, the matrix material comprises between around 5 vol % to around 80 vol % of the material of the intermediate region, and in some examples comprises between around 5 to 60 vol % thereof, or between around 10 vol % to around 30 vol % thereof.

In some examples, the super hard grains in the intermediate region comprise between around 30 vol % to around 70 vol % of the material of the intermediate region.

In some examples, the grains of super hard material in the intermediate region together with any additional phase to the matrix material comprises between around 20 vol % to around 95 vol % of the material of the intermediate region, and in some examples may be between around 70 vol % to around 90 vol % thereof, or between around 50 vol % to around 90 vol % thereof, or between around 30 vol % to around 90 vol % thereof.

The materials forming the layer or region of super hard material, the intermediate region and the substrate all have an associated hardness and, in some examples, the hardness of the intermediate region is greater than the hardness of the substrate and less than the hardness of the layer or region of super hard material.

In some examples, the intermediate region may comprise two or more layer or regions differing in composition and/or construction, such as multiple layers of composite material having at least the characteristic of non intergrown or interbonded grains of super hard material and a matrix material.

The depth of the layer or region of super hard material 34, 44, 54, 64, 74, 94 from the working surface along the peripheral side edge of the respective construction 30, 40, 50, 60, 70, 90 may, for example, be at least around 0.3 mm or greater, such as between around 0.3 mm to around 6.5 mm. Additionally, in some embodiments, the thickness of the intermediate region 36, 46, 56, 66, 76, 96 along a plane parallel to the longitudinal axis of the construction may be at least 0.05 mm, for example between around 0.1 mm to around 4 mm, between around 0.3 to around 1 mm, or between around 0.5 mm to around 0.8 mm.

In any one or more examples, the concentration of super hard grains in the intermediate region may be graded from the interface with the layer or region of super hard material to the substrate.

Furthermore, in some examples, the layer or region of super hard material comprises substantially no constituents of the matrix material of the intermediate region.

In the superhard polycrystalline constructions according to any one or more of the examples, the layer or region of super hard material 34, 44, 54, 64, 72, 84, 94 comprises a thermally stable material such as thermally stable PCD, and, if the super hard material comprises diamond grains, may have a diamond content between around 80 volume % to around 100 volume %. The thermally stable layer of superhard material may, for example, be substantially free of all accessible catalyst material for diamond, said region forming the thermally stable first region, and may, for example comprise at most around 3 weight percent of catalyst material for diamond.

In some examples, the layer of thermally stable super hard material comprises binderless PCD material and/or CVD diamond and/or a polycrystalline super hard material formed from nanodiamond grains.

In any one or more examples, the intermediate region 36, 46, 56, 66, 86, 96 may be bonded to the layer of superhard material and/or to a further intermediate region, and/or to the substrate 32, 42, 52, 62, 82, 92 by a brazed joint and/or a sintered joint along the respective interfaces.

The grains of superhard material used for making the thermally stable superhard layer 34, 44, 54, 64, 84, 94 may be, for example, diamond grains or particles, or for example, lonsdalite or cBN grains or particles. As mentioned above, in the starting mixture prior to sintering they may be, for example, bimodal, that is, the feed comprises a mixture of a coarse fraction of superhard grains and a fine fraction of superhard grains.

In some examples, the binder catalyst/solvent used to assist in the bonding of the grains of superhard material such as diamond grains in the sintering process, may comprise cobalt or some other iron group elements, such as iron or nickel, or an alloy thereof. Carbides, nitrides, borides, and oxides of the metals of Groups IV-VI in the periodic table are other examples of non-diamond material that might be added to the sinter mix. In some examples, the binder/catalyst/sintering aid may be Co.

The super hard constructions of the examples shown in FIGS. 3 to 10 may be fabricated, for example, as follows.

The substrate and intermediate region(s) may be preformed. In some examples, the substrate may be pre-formed by pressing the green body of grains of hard material such as tungsten carbide into the desired shape, including the interface features at one free end thereof, and sintering the green body to form the substrate element. In an alternative example, the substrate interface features may be machined from a sintered cylindrical body of hard material, to form the desired geometry for the interface features. The substrate may, for example, comprise WC particles bonded with a catalyst material such as cobalt, nickel, or iron, or mixtures thereof. A green body for the superhard construction, which comprises the pre-formed substrate, the pre-formed intermediate region and the particles of superhard material such as diamond particles or cubic boron nitride particles, may be placed onto the substrate, to form a pre-sinter assembly which may be encapsulated in a capsule for an ultra-high pressure furnace, as is known in the art. In particular, the superabrasive particles, for example in powder form, are placed inside a metal cup formed, for example, of niobium, tantalum, or titanium. The pre-formed substrate and intermediate region are placed inside the cup and hydrostatically pressed into the superhard powder such that the requisite powder mass is pressed around the interface features of the preformed carbide substrate to form the pre-composite. The pre-composite is then outgassed at about 1050 degrees C. The pre-composite is closed by placing a second cup at the other end and the pre-composite is sealed by cold isostatic pressing or EB welding. The pre-composite is then sintered to form the sintered body.

In some examples, the superhard grains may be diamond grains and the substrate may be cobalt-cemented tungsten carbide. The pre-sinter assembly may comprise an additional source of catalyst material such as a disc containing catalyst material such as cobalt which may be placed adjacent the diamond grains in the pre-composite assembly.

In some examples, the binder catalyst/solvent used in the initial pre-sinter mixture may comprise cobalt or some other iron group elements, such as iron or nickel, or an alloy thereof. Carbides, nitrides, borides, and oxides of the metals of Groups IV-VI in the periodic table are other examples of non-diamond material that might be added to the sinter mix. In some examples, the binder/catalyst/sintering aid may be Co.

In one example, the method may include loading the capsule comprising a pre-sinter assembly into a press and subjecting the green body to an ultra-high pressure and a temperature at which the superhard material is thermodynamically stable to sinter the superhard grains. In some examples, the green body may comprise diamond grains and the pressure to which the assembly is subjected is at least about 5 GPa and the temperature is at least about 1,300 degrees centigrade. In some examples, the pressure to which the assembly may be subjected is around 5.5-6 GPa, but in some examples it may be around 7.7 GPa or greater. Also, in some examples, the temperature used in the sintering process may be in the range of around 1400 to around 1500 degrees C.

After sintering, the polycrystalline super hard constructions may be ground to size and may include, if desired, a 45° chamfer of', for example, approximately 0.4 mm height on the body of polycrystalline super hard material so produced.

Solvent/catalyst for diamond may be introduced into the aggregated mass of diamond grains by various methods, including admixing or blending solvent/catalyst material in powder form with the diamond grains, depositing solvent/catalyst material onto surfaces of the diamond grains, or infiltrating solvent/catalyst material into the aggregated mass from a source of the material, either prior to the sintering step or as part of the sintering step. Methods of depositing solvent/catalyst for diamond, such as cobalt, onto surfaces of diamond grains are well known in the art, and include chemical vapour deposition (CVD), physical vapour deposition (PVD), sputter coating, electrochemical methods, electroless coating methods and atomic layer deposition (ALD). It will be appreciated that the advantages and disadvantages of each depend on the nature of the sintering aid material and coating structure to be deposited, and on characteristics of the grain.

In one example, the binder/catalyst such as cobalt may be deposited onto surfaces of the diamond grains by first depositing a pre-cursor material and then converting the precursor material to a material that comprises elemental metallic cobalt. For example, in the first step cobalt carbonate may be deposited on the diamond grain surfaces using the following reaction:

$$Co(NO_3)_2 + Na_2CO_3 \rightarrow CoCO_3 + 2NaNO_3$$

The deposition of the carbonate or other precursor for cobalt or other solvent/catalyst for diamond may be achieved by means of a method described in PCT patent publication number WO/2006/032982. The cobalt carbonate may then be converted into cobalt and water, for example, by means of pyrolysis reactions such as the following:

$$CoCO_3 \rightarrow CoO + CO_2$$

$$COO + H_2 \rightarrow CO + H_2O$$

In another example, cobalt powder or precursor to cobalt, such as cobalt carbonate, may be blended with the diamond grains. Where a precursor to a solvent/catalyst such as cobalt is used, it may be necessary to heat treat the material in order to effect a reaction to produce the solvent/catalyst material in elemental form before sintering the aggregated mass.

In some examples, the cemented carbide substrate may be formed of tungsten carbide particles bonded together by the binder material, the binder material comprising an alloy of Co, Ni and Cr. The tungsten carbide particles may form at least 70 weight percent and at most 95 weight percent of the substrate. The binder material may comprise between about 10 to 50 wt. % Ni, between about 0.1 to 10 wt. % Cr, and the remainder weight percent comprises Co.

Examples are described in more detail below with reference to the following which are provided herein by way of illustration only and are not intended to be limiting.

Example 1

The super hard constructions of FIGS. 3 to 10 may be formed as follows.

A preformed structure which is to form the intermediate region was made by first forming a non-diamond phase mixture comprising titanium carbonitride and aluminium powders, the TiCN forming around 90 vol % of the non-diamond phase mixture and the Al powder forming around 10 vol % of the non-diamond phase mixture. The stoichiometric ratio of C:N in the TiCN was 0.5:0.5 (with a 90:10 wt % ratio). The average grain size of the aluminium was around 6 microns, and the average grain size of the titanium carbonitrde was around 1.5-2 microns. The diamond powder and non-diamond phase mixture were mixed in a multidirectional Turbula mixer using steel milling balls. After mixing, the powder was then placed into a titanium cup and heated at 1025 degrees Celsius for a period before being cooled and sieved to form a first phase mixture.

The first phase mixture was then attrition milled for around 4 hours in ethanol media using a planetary ball mill with WC milling balls with around 0.6 wt % organic dispersant such as Lubrizol™, cBN and diamond powder having an average grain size of around 10 microns such that the ratio of the diamond powder to non-diamond phase mixture was around 60:40 vol %. After mixing, the powder was dried in a rota vapour apparatus. The dried powder was then dried and sieved to form a pre-composite for the intermediate region.

In preparation of the components to form the PCD layer or region of the super hard construction, diamond powder with an average grain size of about 19 microns was mixed in a planetary ball mill for about 1 hour with 1 wt % Co using methanol media and tungsten carbide milling balls. After mixing, the powder was sieved and dried in a rota vapour apparatus to remove the methanol and WC balls. The dried powder was then returned to the planetary ball mill for about 5 minutes to remove agglomerates before being sieved again.

The pre-composite for the intermediate region was then placed on top of a cemented tungsten carbide substrate shaped to provide an interface between the substrate and the intermediate region at least a portion of which has an uneven topology. The substrate is also shaped to have a recess therein to receive both the pre-composite for the intermediate region and the diamond powder to form the PCD layer, the substrate extending around the pre-composite for the intermediate region and diamond powder acts as an infiltration source during the sintering process for the sintering of the PCD layer.

About 1.4 grams of the prepared diamond power to form the PCD layer was placed on the pre-composite for the intermediate region to form a pre-composite assembly. The assembly was then placed inside a refractory metal can and the can assembly was exposed to a de-binding treatment at 500 degrees Celsius under nitrogen and then vacuum heat treated and sealed at a temperature of around 1100° C. Subsequently the assembly was sealed and placed into a high pressure high temperature (HPHT) apparatus. The assembly was sintered at a pressure of around 8 GPa and a temperature of around 1550° C. for at least 30 seconds to form the cutter construction comprising an inter-bonded polycrystalline diamond (PCD) structure bonded to a substrate material through an intermediate region formed of non-interbonded diamond grains and a matrix phase. At least some constituents in the pre-composite for the intermediate region melt during the HPHT sintering process. In some examples the sintering time was 20-40 minutes, and in some examples was a number of hours. The diamond composite structure forming the intermediate region contained about 60% by volume diamond and there was substantially no interbonding between the diamond grains in the diamond composite structure. The matrix material of the intermediate region in this example was determined to include one or more of TiCN, $Al_2O_3$, and $Al_4C_3$.

The cutter construction was recovered after sintering and fully processed to a diameter of around 16 mm and an overall height of around 13 mm with a PCD table thickness of about 1.3 mm separated from the substrate by the intermediate region formed of a diamond composite having a thickness of between around 0.7 mm to 0.85 mm. The intermediate region formed of the diamond composite extended to the peripheral side edge of the construction, the excess WC forming the substrate during sintering having been removed to expose the peripheral side edge of the PCD layer and the intermediate region.

To render the PCD layer thermally stable, the super hard construction with the intermediate region and substrate attached was subjected to a boiling HCl acid leaching treatment for a number of hours until all accessible residual catalysing material had been removed from the interstitial spaces between inter-bonded diamond grains.

In some examples, the composite material of the intermediate region is more acid resistant than polycrystalline diamond material having a binder-catalyst phase comprising cobalt, and/or more acid resistant than cemented carbide material. The acid resistance of the material of the intermediate region being more acid resistant than PCD containing interstitial cobalt and/or WC may be determined by whether or not it is more resistant to acid damage after 30 hours in a mixture of boiling HCl and water where the HCl forms 20% and the water the residual 80% of the acid leaching mixture, and confirming that the material of the intermediate region shows less than a 10% reduction in its starting weight.

Figure 11:
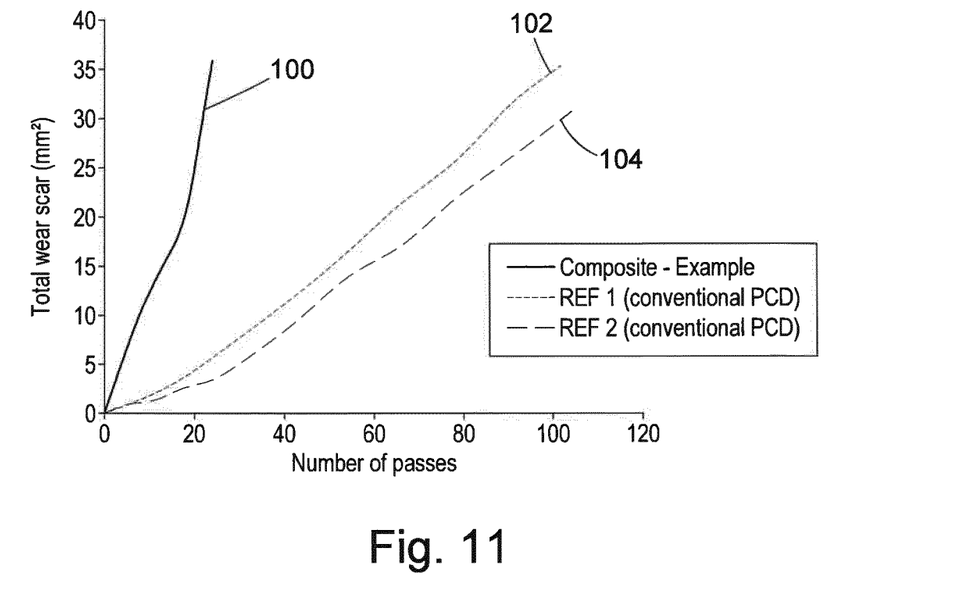
FIG. 11 is a plot showing the results of a vertical borer test comparing the material of the intermediate region of an example with two conventional PCD cutter elements.

The materials used to form the intermediate region(s) in the various examples were separately tested to confirm that the super hard grains in the material were non-intergrown (non-interbonded) and therefore were diamond composite materials in the examples and not considered to be polycrystalline diamond (PCD) material. The tests performed included vertical boring mill tests with two leached conventional polycrystalline diamond cutter elements formed of diamond grains having an average grain size identical to the grain size in the respective diamond composite materials and which were sintered under pressures of around 5.5 GPa. The results are shown in FIG. 11 and provide an indication of the total wear scar area plotted against cutting length. It was seen that the wear resistance of the diamond composite material denoted by reference numeral 100 was at least three times less (ie worse) than that of the conventional PCD denoted by reference numerals 102, 104 which assisted in proving that the diamond composite materials were not intergrown and therefore were not considered to be polycrystalline diamond materials. This was also evident from SEM and X-ray images of the structures which showed the diamond grains not to be inter-bonded (ie not intergrown) and therefore not classed as PCD material.

Figure 12:
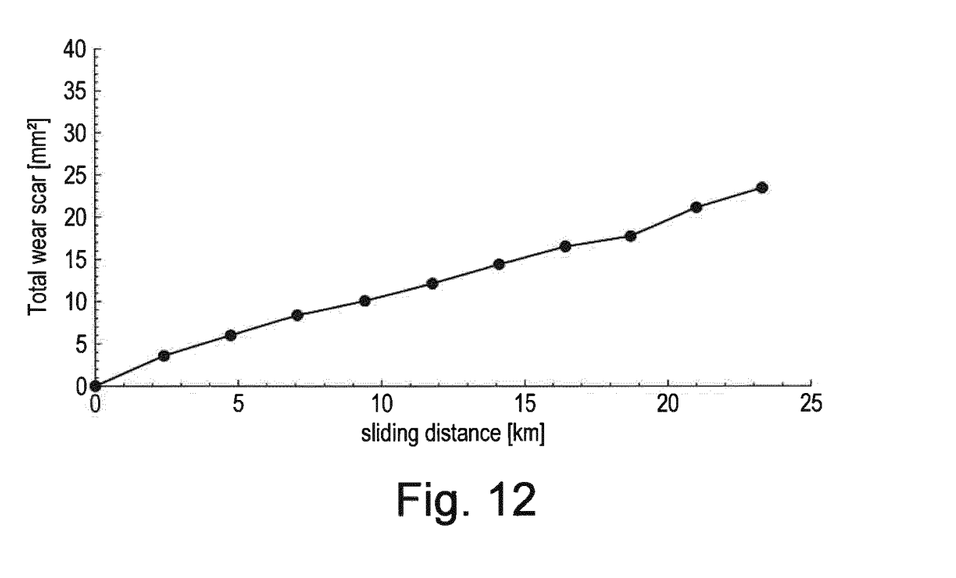
FIG. 12 is a plot showing the results of a vertical borer test for an example super hard construction.
Figure 13:
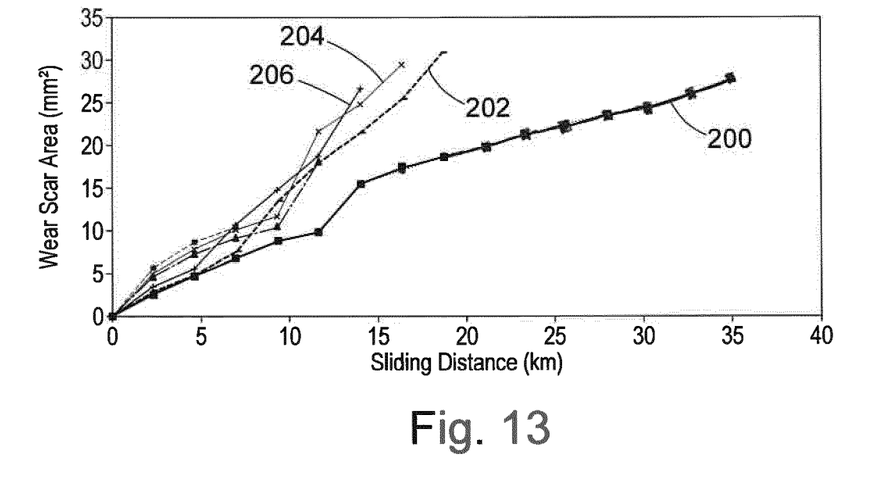
FIG. 13 is a plot showing the results of a vertical borer test comparing an example super hard construction with three conventional PCD cutter elements.

The complete cutter construction itself was brazed to a steel tool holder and subjected to a vertical turret lathe test. The results are shown in FIGS. 12 and 13.

It will be seen that the performance was significantly better than a conventional cutter formed of a PCD layer bonded to a WC substrate in which the PCD layer had the same average grain size as the PCD layer of the example and same PCD layer thickness that had not been subjected to an acid leaching treatment to remove all of the residual catalyst from the PCD region. The vertical turret lathe test was carried out at 50 RPM with 0.2 mm depth of cut, a 20 degree negative back rake angle and a 6 mm per revolution feed rate on Paarl granite rock. The results for the cutter construction of the example are shown in FIG. 12 and by reference numeral 200 in the plot of FIG. 13, the results for the conventional PCD cutters being shown by reference numerals 202, 204 and 206 in the plot of FIG. 13.

Whilst not wishing to be bound by a particular theory, it is believed that in the examples the composition and structure of the intermediate region provides a good support to the TS super hard structure, particularly as, for example, it is known that leaching conventional PCD typically reduces the strength of the PCD by up to around 30%. The intermediate region may be shaped to suit the particular end application of the superhard construction, for example, to ensure that a large surface area of TS superhard material may be presented at the cutting edge so that as the wear scar progresses, the wear is contained in the TS region which is supported by a tough and strong supporting intermediate region. In some examples, a protrusion from the intermediate region may have a higher impact resistance compared to the superhard layer and thereby act to assist in arresting cracks to avoid spalling or catastrophic failure during use of the superhard construction.

The size and shape of the intermediate region and the TS super hard region may be tailored to the final application of the superhard material. It is believed possible to improve spalling resistance without significantly compromising the overall abrasion resistance of the material, which is desirable for PCD and PCBN cutting tools.

Observation of the wear scar development during testing showed the material's ability to generate large wear scars without exhibiting brittle-type micro-fractures (e.g. spalling or chipping), leading to a longer tool life.

Thus, examples of, for example, a PCD material, may be formed having a combination of high abrasion and fracture performance.

The superhard constructions may be finished by, for example, grinding, to provide a super hard element which is substantially cylindrical and having a substantially planar working surface, or a generally domed, pointed, rounded conical or frusto-conical working surface. The super hard element may be suitable for use in, for example, a rotary shear (or drag) bit for boring into the earth, for a percussion drill bit or for a pick for mining or asphalt degradation.

While various versions have been described with reference to a number of examples, those skilled in the art will understand that various changes may be made and equivalents may be substituted for elements thereof and that these examples are not intended to limit the particular versions disclosed. For example, to render the PCD thermally stable, the PCD structure with the intermediate region attached may be subjected to acid to leach out catalyst material from between the diamond grains, or to other methods of achieving this, such as electrochemical methods.

The invention claimed is:

1. A super hard polycrystalline construction comprising:
   a first region comprising a body of thermally stable polycrystalline super hard material having an exposed surface forming a working surface, and a peripheral side edge, said polycrystalline super hard material comprising a plurality of intergrown grains of super hard material;
   a second region forming a substrate to the first region; and
   a third region interposed between the first and second regions; wherein:
   the third region extends across a surface of the second region along an interface surface, the interface surface having an uneven topology with peaks and troughs, the third region comprising a composite material having:
      a first phase comprising a plurality of non-intergrown diamond grains, and a matrix material, the matrix material comprising between around 5 vol % to around 80 vol % of the third region; and
      a second phase;
   the non-intergrown diamond grains and the second phase of the composite material comprise between 20 vol % to 95 vol % of the third region; and
   the third region has a wear resistance at least three times less than a sintered polycrystalline diamond material having the same average grain size of diamond grains as the diamond grains in the third region.

2. The polycrystalline super hard construction of claim 1, wherein the second phase comprises CBN, and/or WC, and/or wBN.

3. The polycrystalline super hard construction of claim 1, wherein the second phase is formed of a material having a hardness less than the hardness of the first phase of the composite material.

4. The polycrystalline super hard construction of claim 1, wherein the matrix material of the third region comprises any one or more alloys or compounds of any one or more transition metals including titanium, zirconium, vanadium, hafnium, tantalum, niobium, chromium, molybdenum, tungsten, copper, cobalt, nickel, iron, manganese, and/or rhenium.

5. The polycrystalline super hard construction of claim 4, wherein the one or more alloys or compounds of any one or more of the transition metals comprises oxides, nitrides, carbides, carbonitrides, and/or oxycarbides of said transition metals.

6. The polycrystalline super hard construction of claim 1, wherein the matrix material comprises aluminium, and/or nickel, and/or one or more alloys or compounds thereof.

7. The polycrystalline super hard construction of claim 1, wherein the matrix material of the third region comprises any one or more of titanium carbonitride, titanium diboride, aluminium nitride, aluminium oxide, cobalt, and tungsten carbide.

8. The polycrystalline super hard construction of claim 1, wherein the non-intergrown diamond grains of the composite material comprise between 30 vol % to 90 vol % of the third region.

9. The polycrystalline super hard construction of claim 1, wherein the first region, the second region and the third region each have an associated hardness, wherein the hardness of the third region is greater than the hardness of the second region and less than the hardness of the first region.

10. The polycrystalline super hard construction of claim 1, wherein the grains of super hard material of the first region comprise diamond grains, the first region forming a body of polycrystalline diamond material.

11. The polycrystalline super hard construction of claim 1, wherein the composite material of the third region is more acid resistant than polycrystalline diamond material having a binder-catalyst phase comprising cobalt, and/or more acid resistant than cemented carbide material.

12. The polycrystalline super hard construction of claim 11, wherein the composite material of the third region is more resistant to boiling HCl acid than polycrystalline diamond material having a binder-catalyst phase comprising cobalt, and/or more resistant to boiling HCl acid than cemented carbide material.

13. The polycrystalline super hard construction of claim 1, wherein the second region comprises cemented carbide material.

14. The super hard polycrystalline construction of claim 1, wherein the first region is substantially free of a catalyst material for diamond.

15. The super hard polycrystalline construction of claim 1, wherein the thermally stable first region comprises at most 3 weight percent of inaccessible catalyst material for diamond.

16. The super hard polycrystalline construction of claim 1, wherein the construction has a longitudinal axis, the thickness of the third region along a plane parallel to the longitudinal axis being between 0.1 mm to 4 mm.

17. The super hard polycrystalline construction of claim 1, further comprising a fourth region interposed between the second region and the third region, the second region comprising a binder material, a major proportion of the fourth region comprising one or more components of the binder material of the second region, the fourth region further comprising one or more reaction products between the binder material of the second region and one or more components of the third region.

18. The super hard polycrystalline construction of claim 17, wherein the fourth region comprises one or more components or alloys of Co, nickel, chromium, vanadium, molybdenum, titanium, tantalum, iron, manganese, and hafnium.

19. The super hard polycrystalline construction of claim 17, wherein the fourth region comprises diamond grains and/or cBN grains.

* * * * *